(12) United States Patent
Couch (10) Patent No.: US 6,618,718 B1
(45) Date of Patent: Sep. 9, 2003

(54) APPARATUS AND METHOD FOR DYNAMICALLY GENERATING QUERY EXPLAIN DATA

(75) Inventor: Tanya Couch, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/482,375

(22) Filed: Jan. 13, 2000

Related U.S. Application Data (63) Continuation-in-part of application No. 08/949,636, filed on Oct. 14, 1997, now Pat. No. 6,243,703.

(51) Int. Cl.[7] .............................................. G06F 17/30
(52) U.S. Cl. ........................ 707/2; 707/4; 707/104.1; 707/10
(58) Field of Search ...................................... 707/1–10

(56) References Cited

U.S. PATENT DOCUMENTS

| | | | |
|---|---|---|---|
| 4,531,186 A | | 7/1985 | Knapman |
| 5,345,585 A | | 9/1994 | Iyer et al. |
| 5,367,675 A | | 11/1994 | Cheng et al. |
| 5,428,737 A | | 6/1995 | Li et al. |
| 5,555,403 A | | 9/1996 | Cambot et al. |
| 5,596,745 A | | 1/1997 | Lai et al. |
| 5,701,453 A | * | 12/1997 | Maloney et al. ............. 702/2 |
| 5,713,018 A | | 1/1998 | Chan |
| 5,734,884 A | * | 3/1998 | Eberhard et al. ............. 707/2 |
| 5,761,654 A | | 6/1998 | Tow .............................. 707/2 |
| 5,765,149 A | | 6/1998 | Burrows ....................... 707/5 |
| 5,778,357 A | * | 7/1998 | Kolton et al. ................ 707/2 |
| 5,781,898 A | * | 7/1998 | Fukatsu et al. .............. 707/4 |
| 5,787,416 A | * | 7/1998 | Tabb et al. ................... 707/2 |
| 5,806,059 A | * | 9/1998 | Tsuchida et al. ............. 707/2 |
| 5,826,076 A | | 10/1998 | Bradley et al. |
| 5,873,096 A | | 2/1999 | Lim et al. .................. 707/201 |
| 5,909,678 A | | 6/1999 | Bergman et al. ............. 707/4 |
| 5,930,786 A | * | 7/1999 | Carino, Jr. et al. ........... 707/4 |
| 6,195,653 B1 | * | 2/2001 | Bleizeffer et al. ............. 707/2 |
| 6,285,997 B1 | * | 9/2001 | Carey et al. .................. 707/4 |
| 6,397,207 B1 | * | 5/2002 | Bleizeffer et al. ............. 707/2 |
| 6,493,700 B2 | * | 12/2002 | Couch et al. ................. 707/2 |

OTHER PUBLICATIONS

Sarawagi S. et al., Integrating Association Rule Mining with Relational Database Systems: alternatives and implications, Sigmond Record, vol. 27, No. 2, pp. 343–354, Jun. 1998.

Method for Optimizing for N Rows in a Database Management System; IBM Technical Disclosure Bulletin; vol. 38 No. 12, Dec. 1995; p. 317.

Referential Integrity Implementation Details and Advantages; IBM Technical Disclosure Bulletin; vol. 38, No. 3, Mar. 1995, pp. 477–487.

Multiple Indexed Access Path in a Relational Database System; IBM Technical Disclosure Bulletin; vol. 32, No. 10B, Mar. 1990; pp. 388–392.

* cited by examiner

Primary Examiner—Hosain T. Alam
Assistant Examiner—Anh Ly
(74) Attorney, Agent, or Firm—Kunzler & Associates (57) ABSTRACT

An apparatus for dynamically generating query explain data includes modules of operational data and executable code for execution by a computer processor. The modules include a query explain program operating on a workstation. The query explain program communicates over a network with a server hosting a database system and is configured to request generation of query explain data by the database system. A query identification module is configured to communicate with the query explain program to receive a selected query for which a user wishes the database system to generate the query explain data. A system settings module is configured to communicate with the query explain program to receive a user designation of a database system setting with which the user wishes the database system to temporarily comply when generating the query explain data.

31 Claims, 8 Drawing Sheets

Fig. 8

APPARATUS AND METHOD FOR DYNAMICALLY GENERATING QUERY EXPLAIN DATA

RELATED APPLICATIONS

This application is a continuation-in-part of U.S. patent application Ser. No. 08/949,636, filed Oct. 14, 1997, U.S. Pat. No. 6,243,703 for "Interpreting Data Using a Graphical User Interface," which is incorporated herein by reference.

BACKGROUND OF THE INVENTION

IDENTIFICATION OF COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

1. The Field of the Invention

The present invention relates generally to computer-implemented database systems. More specifically, the present invention relates to an apparatus and method for dynamically generating query explain data with a database system.

2. The Relevant Technology

Databases are computerized information storage and retrieval systems. Databases are managed by systems and may take the form of relational databases and hierarchical databases. A Relational Database Management System (RDBMS) is a database system which uses relational techniques for storing and retrieving data. Relational databases are organized into tables consisting of rows (tuples) and columns of data. A relational database typically includes many tables, and each table includes multiple rows and columns. The tables are conventionally stored in direct access storage devices (DASD), such as magnetic or optical disk drives, for semi-permanent storage.

Generally, users communicate with an RDBMS using a Structured Query Language (SQL) interface. The SQL interface allows users to create, manipulate, and query a database by formulating relational operations on the tables, either interactively, in batch files, or embedded in host languages such as C and COBOL. SQL has evolved into a standard language for RDBMS software and has been adopted as such by both the American National Standards Institute (ANSI) and the International Standards Organization (ISO).

The SQL standard provides that each RDBMS should respond to a particular query in the same way, regardless of the underlying database. However, the method that the RDBMS actually uses to find the requested information in the database is left to the RDBMS. Typically, the RDBMS is capable of accessing the requested data in a number of different manners. The RDBMS, therefore, attempts to select the manner that minimizes the computer time and resources (i.e. cost) for executing the query.

When the RDBMS determines how to execute the SQL statements, the set of steps created by the RDBMS for executing the SQL statements is commonly referred to as the "access path." In other words, the access path is a sequence of operations used by the RDBMS to obtain the data requested by the SQL query. Depending on the access path, an SQL statement might, for instance, search an entire table space, or it might use an index. The access path is a key to determining how well an SQL statement performs. The description of the access path is stored in a table often referred to as a "plan table," which typically stores the access path data for one or more SQL statements.

In addition to determining the access path many databases estimate the cost (in time or service units) for executing each SQL statement. Typically, the estimated costs are stored in a table, referred to in the case of DB2® for OS/390® as a "statement table." Like the plan table, the statement table generally stores the estimated statement costs for one or more SQL statements.

Moreover, some databases store information relating to user-defined functions in a table often referred to as a "function table." User-defined functions can be very useful in developing database applications. Accordingly, it is advantageous to have information relating to the user-defined functions in a single, convenient location.

Collectively, the above-described access path data, statement cost data, and function data are referred to herein as "explain data." The plan table, statement table, and function table are referred to herein as "explain tables." Many database systems, such as the RDBMS, provide a query explain program which is used to access the explain data for user-selected queries. The query explain programs are in some instances configured to provide the information in a graphical manner, or in a manner otherwise readily comprehendible to a user.

While the explain data is typically generated at bind time, the explain data can also be generated dynamically in response to a user-supplied query statement. The user can alter the queries submitted to dynamically modify or enter SQL statements and quickly see the results.

To make this capability even more powerful, it has been found beneficial by the inventors to be able to control as many parameters of the explain function as possible in order to better customize the received results, and thereby better analyze a given query for efficiency and effectiveness. Additionally, the inventors have found it beneficial to be able to enter the SQL query for which explain data is desired to be generated from a remote location, and from a remote program, and be able to control the RDBMS (or other database system) parameters for the specific query being entered from the remote program.

Accordingly, it would be beneficial to provide a system, method, and article of manufacture for customizing queries remotely and for generating query explain data for the queries remotely on the database system. It would be even more beneficial if such a system were provided in which system parameters and defaults, such as database system settings, could be set on a case by case basis from the remote program for a selected query.

SUMMARY OF THE INVENTION

The present invention solves the foregoing problems by providing a system, method, and article of manufacture for dynamically generating query explain data. In one aspect of the invention, an apparatus includes a processor for executing instructions and a memory device having thereon modules of operational data and executable code for execution by the processor.

In one embodiment, the modules include a query explain program configured to operate on a first computer station communicating over the network with a second computer station hosting the database system. Preferably, the query explain program is also configured to request generation of query explain data by the database system over the network.

A query identification module is preferably adapted to communicate with the query for which the user wishes the database system to generate the query explain data. A system settings module is preferably configured to communicate with the query explain program and to receive a user designation of one or more database system settings with which the user wishes the database system to comply when generating the query explain data.

In one embodiment, the second computer station comprises a server and the first computer station preferably comprises a work station attached to the server. The system setting may comprise a default query execution setting.

The query explain program may include a graphical user interface (GUI) configured to be displayed on an output device connected to the first computer station. Preferably, the GUI window comprises user controls for receiving the user designation and configuration of the system settings for which the user wishes the database system to comply for execution of query execution data for the selected query.

In one embodiment, the GUI window comprises a SQL query text editor configured to receive the designation of the selected query from a user. The GUI window may additionally, or alternatively, comprise a SQL query designation module configured to allow a user to designate the selected query from among a plurality of existing queries previously generated for execution by the database system.

The controls may comprise a pull down window with which the user may configure the system settings. In one embodiment, the system setting comprises a degree of parallel processing with which the database system is to execute the selected query. Other system settings for which the user may designate on a case by case basis for the generation of query execution data include the current SQL ID, which identifies the user ID that owns resources referenced during query execution. Preferably, the system settings module is configured to alter the system setting for only the selected query, and to return the system setting back to the previous configuration after query execution data for the selected query has been generated.

In another aspect of the invention, a method for dynamically generating query explain data is provided and includes a step of providing a query explain program configured to operate on a first computer station communicating over the network with a second computer station hosting the database system. A further step may comprise receiving user input within the query explain program regarding a selected query for which the user wishes the database system to generate query explain data. Additionally, the method may comprise receiving a user designation within the query explain program of a database system setting with which the user wishes the database system to comply when generating the query explain data.

In one embodiment, the second computer station comprises a server, and the first computer station comprises a work station attached to the server, and the system setting comprises a default query execution setting.

Additional steps of the method may comprise providing a graphical user interface (GUI) window accessible through the query explain program. Preferably, the GUI window is configured to be displayed on an output device connected to the first computer station. The method also preferably comprises providing user controls for configuring the system setting. The user controls are preferably accessible through the GUI window.

The method in one embodiment also comprises receiving by the query explain program the selected query from a user. The query may be typed by a user, read from a file, or inserted by means of a paste text file function, or the method may comprise providing to the user a listing of a plurality of existing queries previously generated for execution by the database system and receiving from the user a designation of the selected query from among the plurality of existing queries.

The method in one embodiment also comprises receiving a user designation of one or more system settings. In one embodiment, this comprises providing a pull down window configured to receive the user designation of the system setting.

In one embodiment, the system setting comprises a degree of parallel processing with which the database system is to execute the selected query. Other settings which may be selected by the user for executing query execution data for a selected query comprise the current SQL ID. Preferably, the database system setting is altered in accordance with the user designation for only the selected query, and is returned to its original value after the query execution data has been generated for the selected query.

In yet another aspect of the invention, an article of manufacture comprises a program storage medium readable by a processor and embodying one or more instructions executable by the processor to perform the above-described method of locally caching query execution data received across a network from a database system.

These and other objects, features, and advantages of the present invention will become more fully apparent from the following description and appended claims, or may be learned by the practice of the invention as set forth in the following specification.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

The preferred embodiments of the present invention will be best understood by reference to the drawings, wherein like parts are designated by like numerals throughout. It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in the Figures, is not intended to limit the scope of the invention, as claimed, but is merely representative of presently preferred embodiments of the invention.

The Figures include schematic block diagrams and flow chart diagrams which illustrate in more detail the preferred embodiments of the present invention. The schematic block diagrams illustrate certain embodiments of modules for performing various functions of the present invention. In general, the represented modules include therein executable and operational data for operation within a computer system of FIG. 1 in accordance with the present invention.

As used herein, the term executable data, or merely an "executable," is intended to include any type of computer instructions and computer executable code that may be located within a memory device and/or transmitted as electronic signals over a system bus or network. An identified module of executable code may, for instance, comprise one or more physical or logical blocks of computer instructions which may, for instance, be organized as an object, procedure, or function. Nevertheless, the executables of an identified module need not be located together, but may comprise disparate instructions stored in different locations which together comprise the module and achieve the purpose stated for the module. Indeed, an executable may be a single instruction, or many instructions, and may even be distributed over several different code segments, among different programs, and across several memory devices.

Similarly, operational data may be identified and illustrated herein within modules, and may be embodied in any suitable form and organized within any suitable type of data structure. The operational data may be collected as a single data set, or may be distributed over different locations including over different storage devices, and may at least partially exist merely as electronic signals on a system bus or network.

Figure 1:
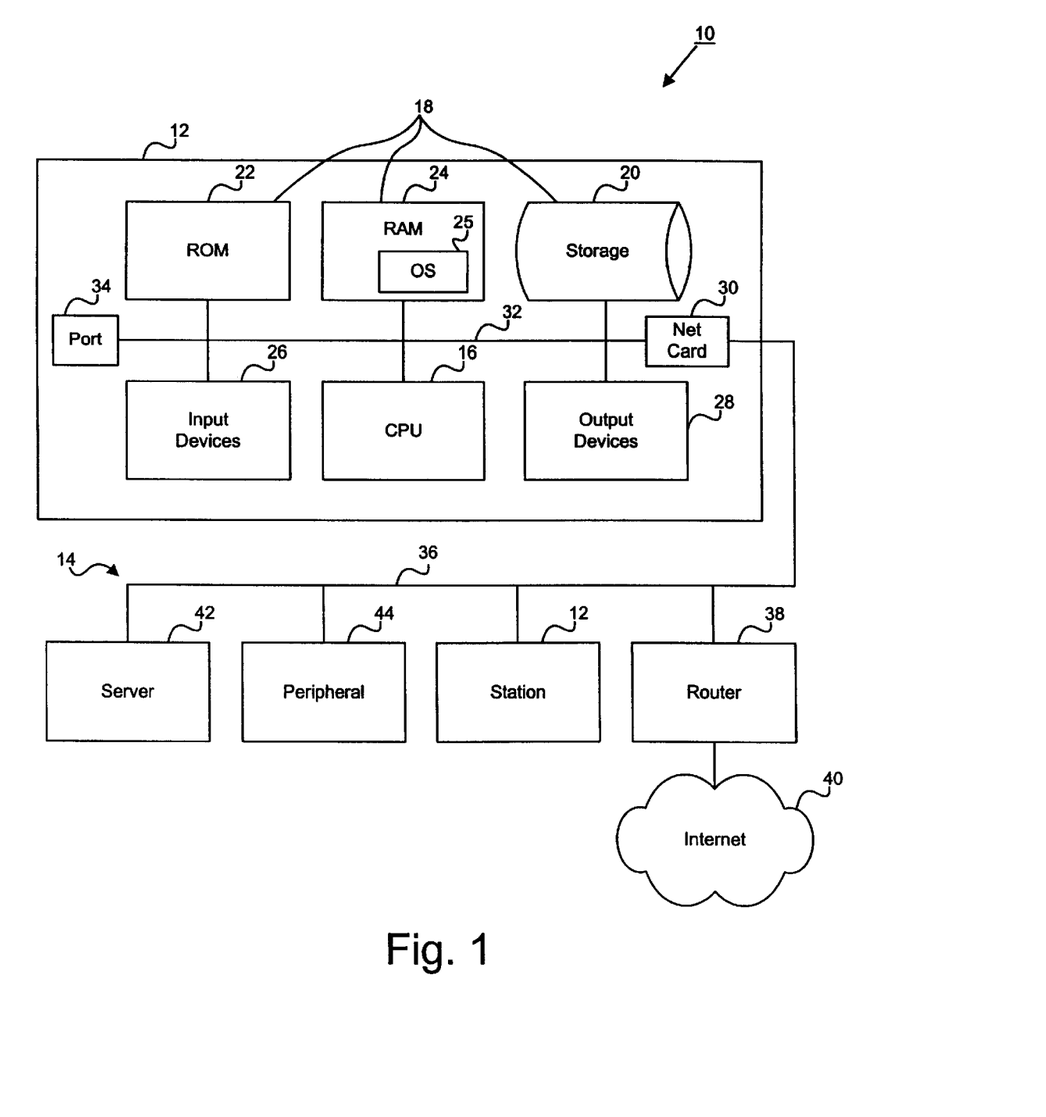
FIG. 1 is a schematic block diagram of a computer system suitable for implementing one embodiment of the invention.

FIG. 1 is a schematic block diagram that illustrates a computer system 10 in which executable and operational data, operating in accordance with the present invention, may be hosted on one or more computer stations 12 in a network 14. The network 14 may comprise a wide area network (WAN) or local area network (LAN) and may also comprise an interconnected system of networks, one particular example of which is the Internet and the World Wide Web supported on the Internet.

A typical computer station 12 may include a processor or CPU 16. The CPU 16 may be operably connected to one or more memory devices 18. The memory devices 18 are depicted as including a non-volatile storage device 20 such as a hard disk drive or CD-ROM drive, a read-only memory (ROM) 22, and a random access volatile memory (RAM) 24. Preferably, the computer station 12 operates under the control of an operating system (OS) 25, such as MVS®, OS/390®, AIX®, OS/2®, WINDOWS NT®, WINDOWS®, UNIX®, and the like.

The computer station 12 or system 10 in general may also include one or more input devices 26, such as a mouse or keyboard, for receiving inputs from a user or from another device. Similarly, one or more output devices 28, such as a monitor or printer, may be provided within or be accessible from the computer system 10. A network port such as a network interface card 30 may be provided for connecting to outside devices through the network 14. In the case where the network 14 is remote from the computer station, the network interface card 30 may comprise a modem, and may connect to the network 14 through a local access line such as a telephone line.

Within any given station 12, a system bus 32 may operably interconnect the CPU 16, the memory devices 18, the input devices 26, the output devices 28, the network card 30, and one or more additional ports 34. The system bus 32 and a network backbone 36 may be regarded as data carriers. As such, the system bus 32 and the network backbone 36 may be embodied in numerous configurations. For instance, wire, fiber optic line, wireless electromagnetic communications by visible light, infrared, and radio frequencies may be implemented as appropriate.

In general, the network 14 may comprise a single local area network (LAN), a wide area network (WAN), several adjoining networks, an Intranet, or as in the manner depicted, a system of interconnected networks such as the Internet 40. The individual stations 12 communicate with each other over the backbone 36 and/or over the Internet 40 with varying degrees and types of communication capabilities and logic capability. The individual stations 12 may include a mainframe computer on which the modules of the present invention may be hosted.

Different communication protocols, e.g., ISO/OSI, IPX, TCP/IP, may be used on the network, but in the case of the Internet, a single, layered communications protocol (TCP/IP) generally enables communications between the differing networks 14 and stations 12. Thus, a communication link may exist, in general, between any of the stations 12.

The stations 12 connected on the network 14 may comprise application servers 42, and/or other resources or peripherals 44, such as printers and scanners. Other networks may be in communication with the network 14 through a router 38 and/or over the Internet 40.

Figure 2:
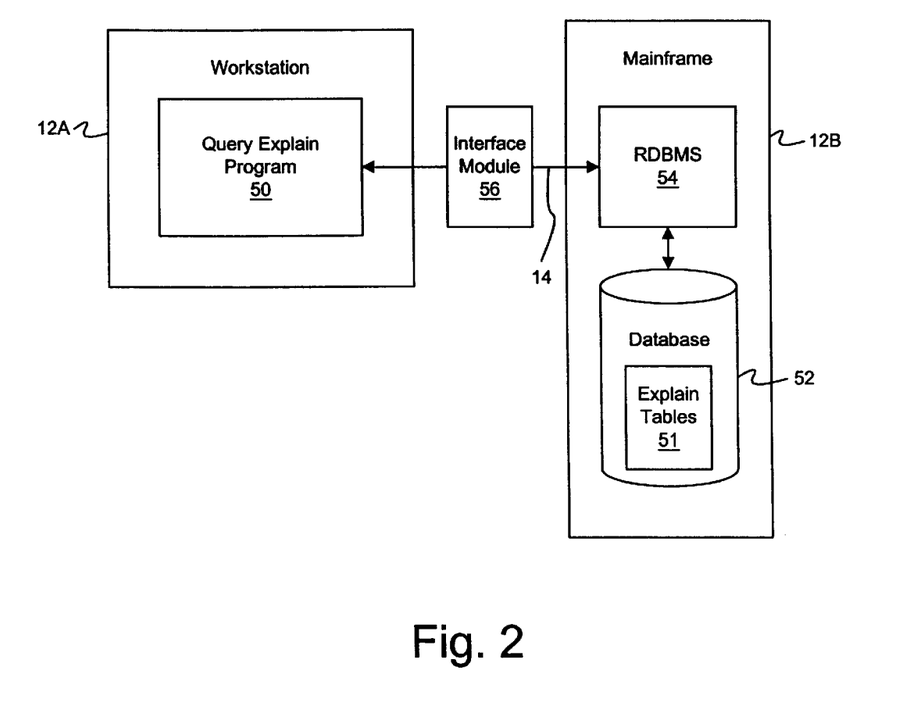
FIG. 2 is a schematic block diagram of a system for filtering explain tables according to one embodiment of the invention.

Referring now to FIG. 2, a schematic block diagram of one embodiment of the invention includes first and second computer stations 12A, 12B. The first computer station 12A is preferably a workstation-class computer, such as a PC™ workstation, available from IBM Corporation. The second computer station 12B is preferably an IBM mainframe computer operating under MVS® or OS/390®. In one embodiment, the stations 12A, 12B are coupled via a network 14 using a distributed remote data architecture (DRDA). Those skilled in the art, however, will recognize that the invention may be implemented using a variety of computing platforms and/or network architectures.

In one embodiment, the first computer station 12A includes a query explain program 50, which is a tool that assists a user in visualizing or otherwise understanding explain data for one or more queries. In one embodiment, the explain data is stored in one or more explain tables 51, which, as described hereafter, may include a plan table, a statement table, and a function table.

The second station 12B preferably stores the database 52, as well as a database system for managing the database 52. In the depicted embodiment, the database system comprises an RDBMS 54, one example of which is DB2® for OS/390®, available from IBM. Of course, other types of database systems could be used as well, such as hierarchical database systems, one example of which is IBM's IMS®. As used herein, the term "database" may generically refer to a combination of the database system (e.g., RDBMS 54) and the database 52. In one embodiment, the query explain program 50 and the database system are linked via an interface module 56, such as DB2 Connect®, also available from IBM.

Figure 3:
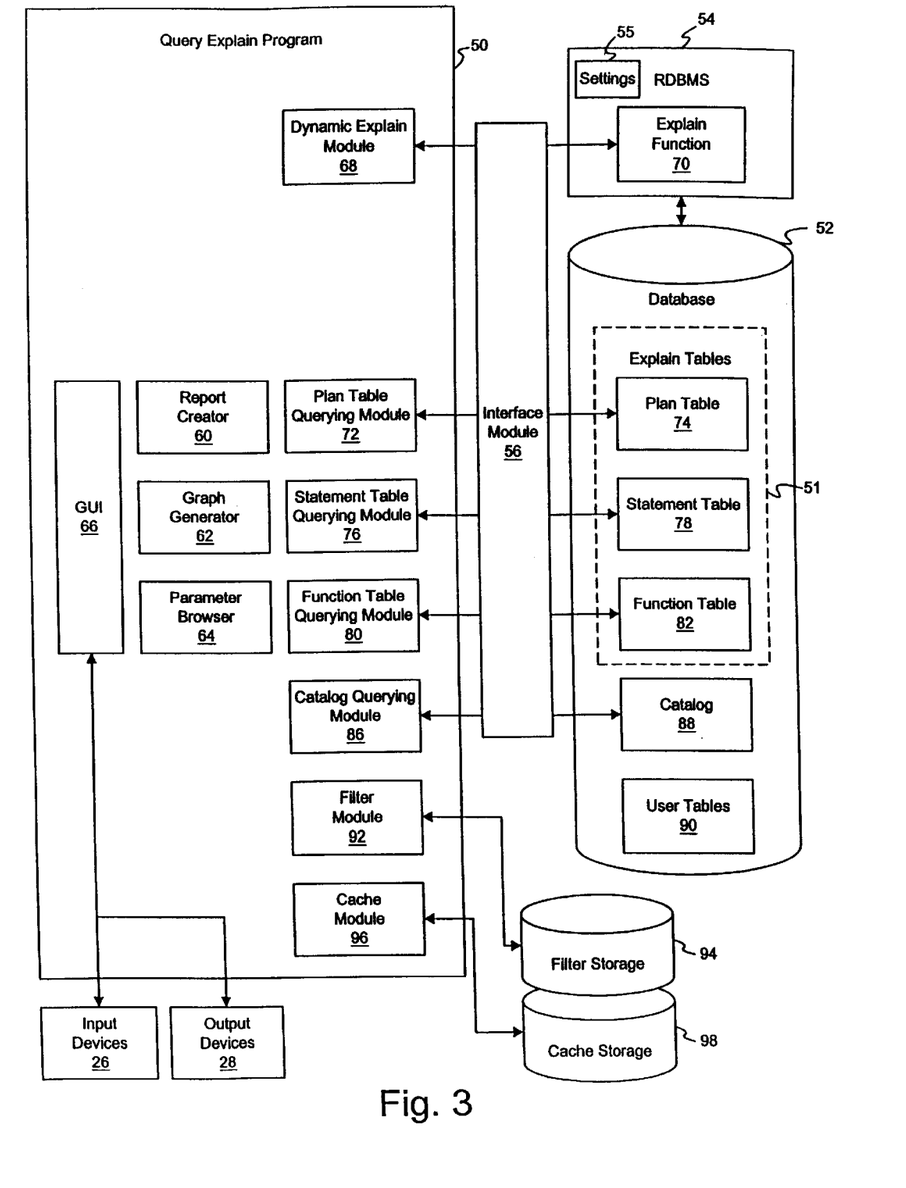
FIG. 3 is a schematic block diagram of a query visualization module according to one embodiment of the invention.

Referring now to FIG. 3, the query explain program 50 preferably includes a plurality of modules containing executable and operational data suitable for operation within the memory devices 18 of FIG. 1. Of course, the memory devices 18 in which the modules of the present invention are located may also be distributed across both local and remote computer stations 12. Likewise, two or more illustrated modules may be integrated into a single module, or the function of a single module could be performed by a group of modules, without departing from the scope of the invention.

In one embodiment, the principle components of the query explain program 50 include a report creator 60, a graph generator 62, and a parameter browser 64. The above-described modules are, in one embodiment, intended to help the user to better understand the explain data, the subsystem parameters, and the like in a variety of ways.

For example, the report creator 60 may be configured to selectively prepare a report of the explain data in an easily understood, text-based format. The user may be provided with the option of selecting one or more query statements, as well as subsets of the explain data for the selected query statements to include in the report. The report preferably provides the user with the requested explain data in a centralized and readily understood format, allowing the user to efficiently analyze and improve SQL query performance. One example of the report creator 60 is more fully described in co-pending U.S. application Ser. No. 09/482,595, filed Jan. 13, 2000 using Express Mail Label EL409135377US, for "System and Method for Selectively Preparing Customized Reports of Query Explain Data," which is commonly assigned and is incorporated herein by reference.

A further component of the query explain program 50 may comprise a graph generator 62, which is preferably configured to prepare a graphical representation of the access path of a query statement. One example of the graph generator 62 is more fully described in co-pending application Ser. No. 08/949,636, filed Oct. 14, 1997, for "Interpreting Data Using a Graphical User Interface," which is incorporated herein by reference.

Figure 4:
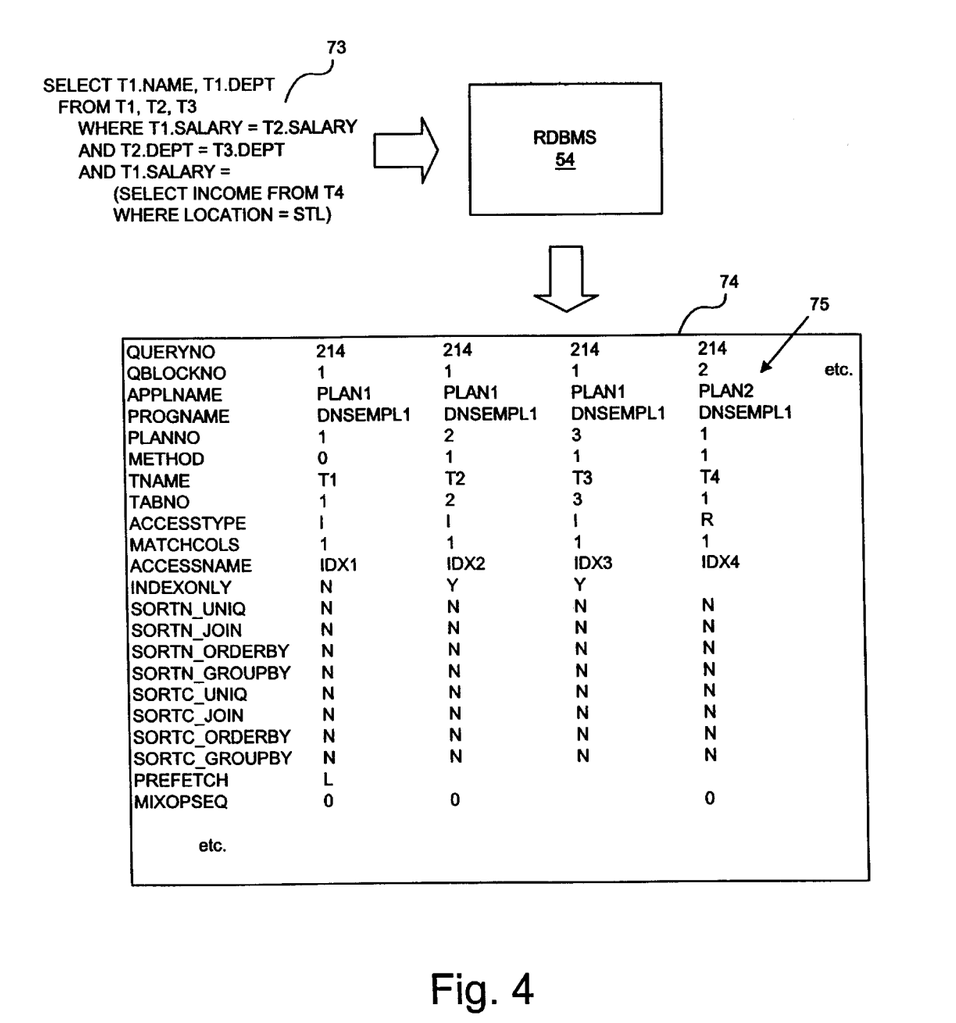
FIG. 4 is an illustration of a query statement and a portion of a plan table according to one embodiment of the invention.

FIG. 4 illustrates an exemplary SQL query statement 73. The query statement of FIG. 4 is shown converted by an RDBMS 54 into access path data 75 and stored within a plan table 74 according to one embodiment of the present invention.

Figure 5:
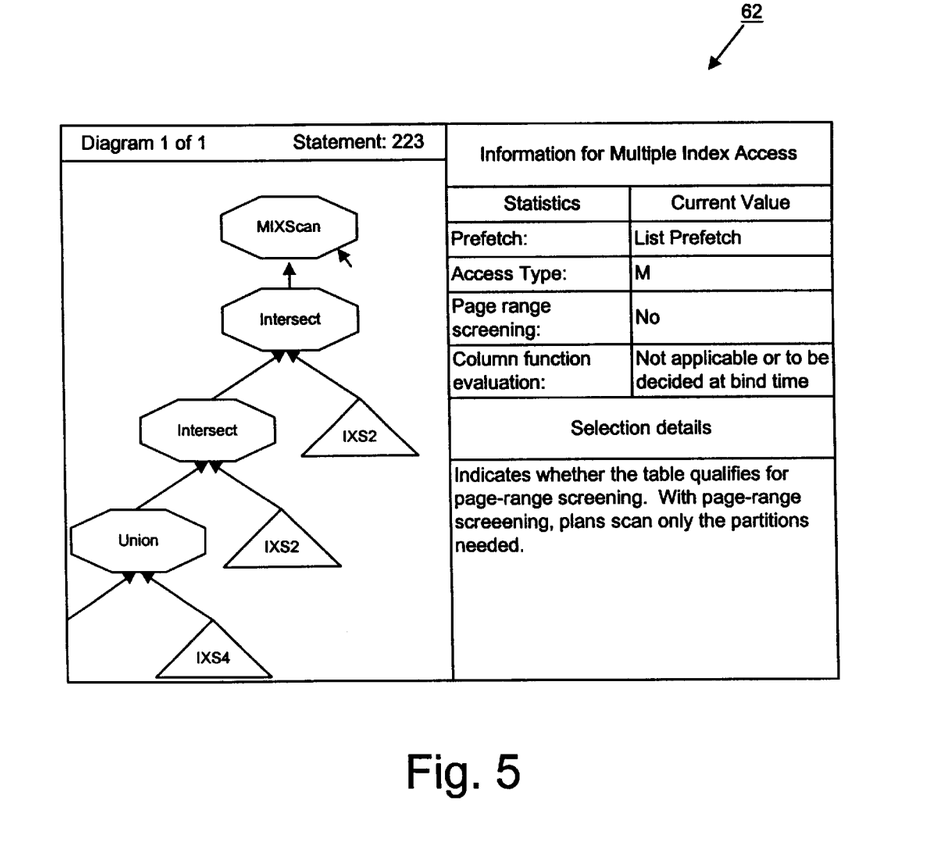
FIG. 5 is an illustration of a graphical representation of an access path according to one embodiment of the invention.

As shown in FIG. 5, the graph generator 62 in one embodiment uses data received from the plan table 74 to generate a graphical representation of the access path. Preferably, access path steps of an SQL statement are graphically represented as nodes within a tree-like structure. Tables, indexes, and operations are graphically represented with unique symbols that indicate the item being represented. For example, rectangles represent tables, triangles represent indexes, and octagons represent operations such as table space scans, index scans, joins, etc. The graphical representation shows the relationship between the database objects and the operations. When the user selects a node of the graphical representation, detailed information related to the selected node is displayed on the right side of the display.

Referring again to FIG. 3, a third principal component of the query explain program 50 is the parameter browser 64. Preferably, the parameter browser 64 allows a user to selectively view the subsystem parameters, for example, DSNZPARM and DSNHDECP values, used by a subsystem, as well as the install panel names and fields. Access to subsystem parameters is useful in analyzing the performance of query statements. Like the graph generator 62, the parameter browser 64 is more fully described in co-pending application Ser. No. 08/949,636, filed Oct. 14, 1997, for "Interpreting Data Using a Graphical User Interface."

The report creator 60, graph generator 62, and parameter browser 64 are each preferably coupled to a graphical user interface (GUI) module 66. Preferably, the GUI module 66 is operably coupled to the input and output devices 26, 28 to allow the user to interact with the report creator 60, graph generator 62, and parameter browser 64.

The query explain program 50 in the depicted embodiment also includes a dynamic explain module 68, which invokes a corresponding explain function 70 in the RDBMS 54. When invoked, the explain function 70 causes the RDBMS 54 to dynamically generate explain tables 51 for one or more explainable query statements.

In one embodiment, the explain tables 51 includes subsets of query explain data for the explainable query statements. The query explain data preferably indicates how the RDBMS 54 will execute the query statements. For instance, in one embodiment, the explain tables 51 include a plan table 74 for storing access path data, a statement table 78 for storing statement cost data, and a function table 82 for storing data related to user-defined functions. The precise names of the tables are not relevant, and other tables including the same information are within the scope of the present invention.

Preferably, the explainable query statements include the SELECT (except SELECT INTO) and INSERT statements, and the searched form of the UPDATE and the DELETE statements. The dynamic explain module 68 is used to invoke an explain function 70 in which the RDBMS 54 immediately generates explain data for a specific SQL statement. This feature is useful for interactively testing specified SQL statements. Alternatively, the RDBMS 54 generates the explain data at bind time in the context of an application or package upon encountering an EXPLAIN (YES) option of the BIND command.

In one embodiment, the query explain program 50 includes a plurality of querying modules for querying various tables in the database 52. For example, a plan table querying module 72 queries a plan table 74 to obtain access path data. Likewise, a statement table querying module 76 queries a statement table 78 to obtain statement cost data. A function table querying module 80 queries a function table 82 to obtain data concerning user-defined functions. Finally, a catalog querying module 86 queries the RDBMS catalog 88 to obtain object statistics for one or more database objects contained within a plurality of user tables 90.

In one embodiment, the above-described modules use the interface module 56 when communicating with the RDBMS 54 and database 52. Although the querying function is implemented herein by four separate modules, those skilled in the art will recognize that the described functionality may be implemented by fewer modules.

Preferably, the query explain program 50 also includes a filter module 92. In one embodiment, the filter module 92 allows a user to filter a list of explainable query statements according to various user-selected criteria, including statement costs, references to particular database objects, and the inclusion of particular steps in the access paths of the statements. Moreover, in one embodiment, the user may assign a name to a set of filtering criteria and save the named set of criteria to, and retrieve the set from, a filter storage 94.

In one embodiment, the filter module 92 also allows a user to filter the explain tables 51 themselves according to user-defined filters. In one embodiment, the filters are directed to data within one or more user-selected columns in the explain tables 51 and are used to selectively exclude rows of the tables 51 that do not satisfy the user-specified filtering criteria.

The query explain program 50 also preferably includes a cache module 96, which caches portions of the above-described tables in a cache storage 98. For example, when the plan table querying module 72 retrieves access path data from the plan table 74, the access path data is preferably stored, and future accesses to the same data will be retrieved from the cache storage 98. Various methods may be employed for managing data in the cache storage 98, such as automatically deleting a percentage of the cached data when the amount of the data exceeds a pre-defined threshold.

Figure 6:
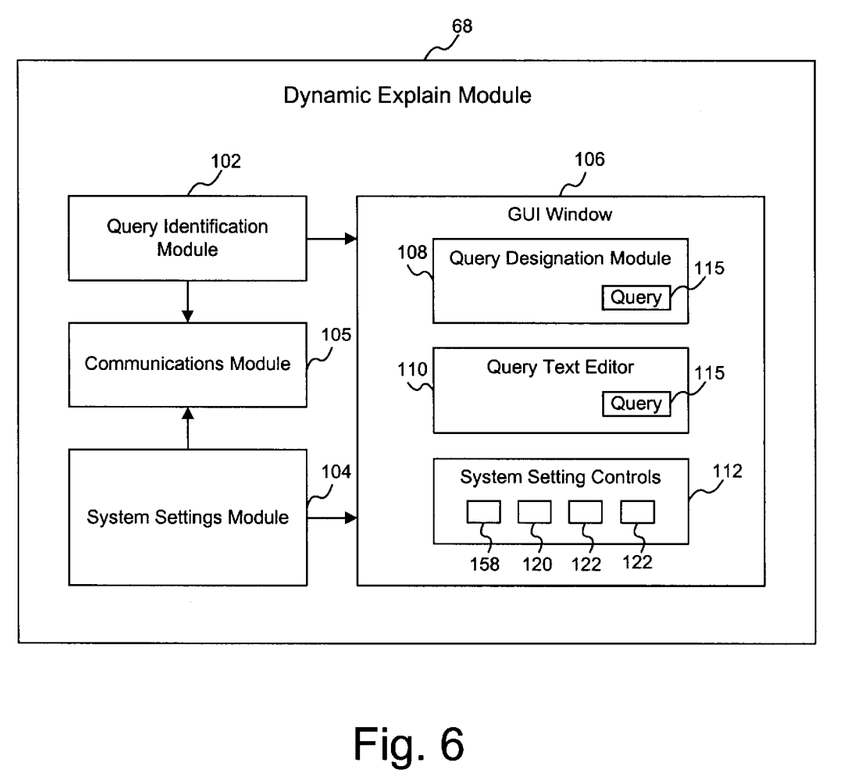
FIG. 6 is a schematic block diagram of a dynamic explain module according to one embodiment of the invention.

FIG. 6 shows one embodiment of the dynamic explain module 68 in greater detail. The dynamic explain module 68 is, in the depicted embodiment, configured to allow a user to select from among existing queries, to edit the existing queries, and to enter new queries. The user may then elect to have query explain data dynamically generated by the database system. Using the different explain functions of the query explain program 50, the user can then see the explain data in a graphical form or in a report form based on the SQL text supplied by the user or otherwise based on the modifications made to a selected SQL statement.

In order to provide even greater power and functionality to these investigations, the dynamic explain module 68 is also adapted to allow a user to temporarily alter the database system settings 55 (of FIG. 3) for the dynamic generation of the query explain data. Thus, the user can see the results of different system setting 55 for queries, including seeing what the effects of changing queries with constant and changed system settings 55 are.

Figure 7:
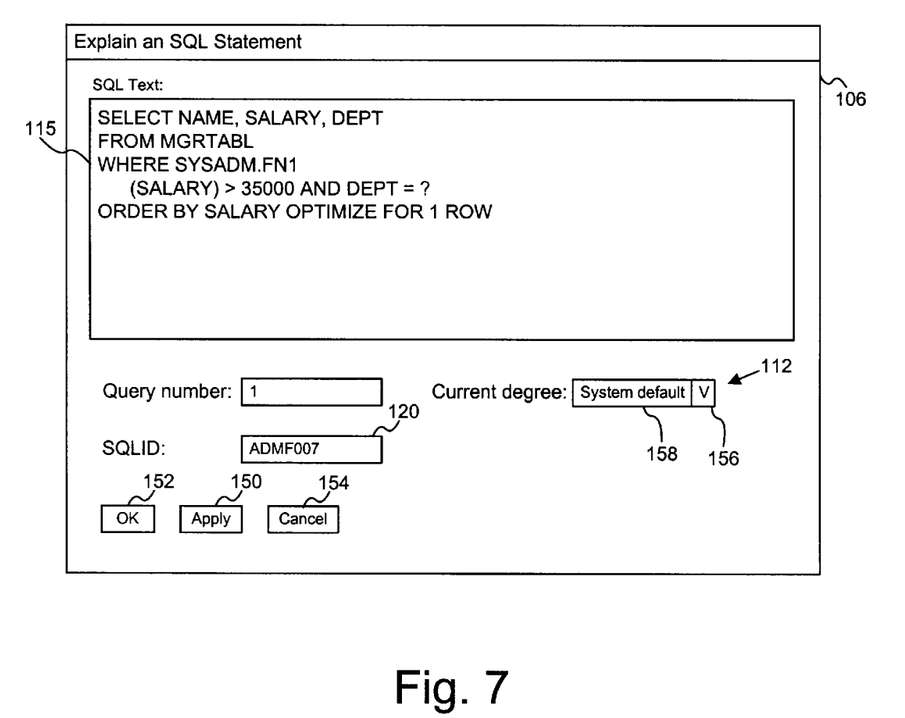
FIG. 7 is an illustration of an interactive display for generating query explain data for user-specified statements according to one embodiment of the invention.

In the depicted embodiment, the dynamic explain module 68 comprises a query identification module 102, a system settings module 104, a communication module 105, and a graphical user interface (GUI) window 106. The query identification module 102 and the system settings module 104 are preferably communicably linked to the communication module 105. One example of the appearance of the GUI window 106 is shown in FIG. 7.

The GUI window 106 is preferably displayed to a user on an output device 28, such as a monitor, and is configured to receive a user designation of a selected query 115 for which the user wishes the database system (e.g., RDBMS 54) to generate query explain data.(e.g., the contents of the explain table 51). The query identification module 102 preferably communicates with the GUI window 106 to receive the user designation of the query 115 and notify the communication module 105 of the receipt of the query. The communication module 105 is configured to initiate the transmission of the request to the database 52 for the generation of the explain data for the given or selected query 115.

Similarly, the GUI window 106 is configured to receive system setting 55 of the database system 54 with which the user wishes the database system 54 to comply when generating query execution data for the selected query 115. The system settings module 105 is configured to receive the system settings and notify the communication module 105 of the receipt of the system settings. The communication module 105 is configured to received the system setting information 55 and relay it to the database system 54. Once the query explain data is generated for the query 115 or group of queries 115, the system settings 55 are preferably returned to their previous value or to a default value.

In the embodiment depicted in FIG. 6, the GUI window 106 comprises a query designation module 108, a query text editor 110, and a plurality of system settings controls 112. Among the system settings controls 112 may be a parallelism control 156, a current SQL ID control 120, and one or more additional controls 122, as needed.

The GUI window 106 of FIG. 7 is shown comprising a query window 142, in which a SQL query 115 for which the user desires query explain data 51 to be generated appears. The SQL query 115 is preferably generated within the query window 142 in one of two manners. The query designation module 108 may be used to designate a preexisting query. Typically, this is accomplished by selecting a particular query 115 from a list of queries 115 that is displayed as part of another function of the query explain program 50. Thereafter, the user may select an explain function from a pull-down menu or an icon. In one embodiment, a window may open with the SQL text pre-filled in.

If the SQL query 115 selected within the query window 142 is selected from existing queries, query explain information may be generated dynamically for the query 115. Additionally, the query 115 may be edited and given a new query identification number and the new query explain data 51 generated therefor. Clicking "OK" 152 causes the dynamic explain function 70 to take place and the current window 142 to close. A cancel control 154 may be used to cancel the function 70 and close the window 142. Of course, other suitable controls could also be used for these functions.

Alternatively, the user may generate a new query within the query window 142 and instruct the database system 54 to dynamically generate query explain data 51 for the new query. The user may, for example, type in the new query, read it from a file, or paste it from the clipboard.

In addition, system setting controls 112 may also be present. These controls are shown in FIG. 6 at 156, 120, and 122. In FIG. 7, a single control, a parallel processing degree control 156 is shown. In this embodiment, the degree of parallel processing desired during the determination of the access path is selected with a pull-down menu 158. Of course, other suitable types of controls could also be used. The controls 156, 120, 122 for configuring system settings could also be included within the GUI window 106, as could any other suitable controls.

Preferably, the system settings 55 which can be configured using the dynamic explain module 68 are those that affect access path. Typically these controls are set at bind time, or are database system 54 default settings. The present discussion illustrates several such system settings which can be configured dynamically with the controls 156, 120, 122, but of course, these are only representative examples of the system settings 55 which may be configured using the dynamic explain module of the present invention.

Figure 8:
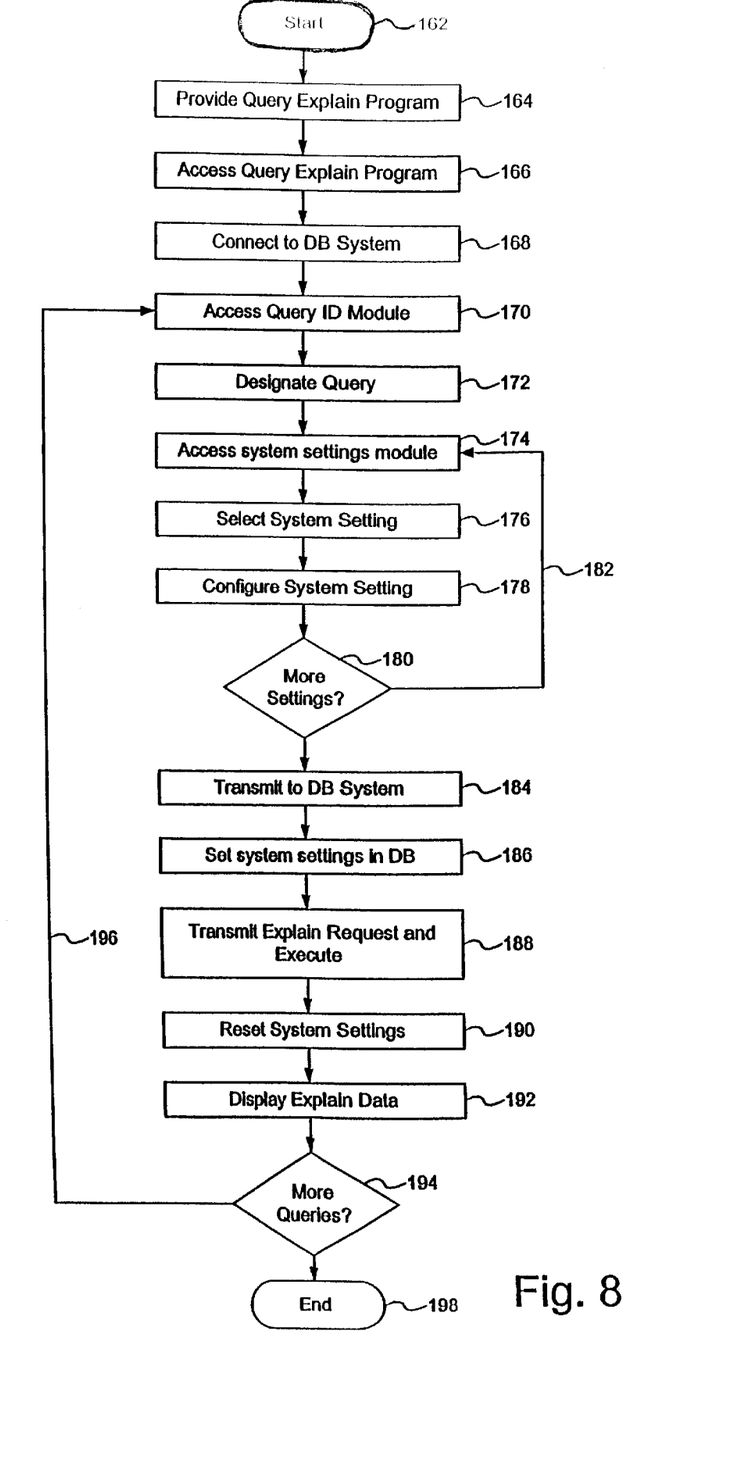
FIG. 8 is a schematic flow chart diagram of a method of dynamically generating query explain data with user selection of settings of a database system.

FIG. 8 illustrates one method 160. of dynamically generating query explain data 115 of the present invention. The method 160 preferably utilizes the apparatus of FIGS. 1 through 7, and will be explained in conjunction with the description and number of FIGS. 1 through 7.

The method 160 starts at a step 162 and progresses to a step 164 in which the query explain program 50 is provided. This may comprise writing and producing the program 50, or may simply comprise buying or otherwise procuring a copy of the query explain program 50. At a step 166, the query explain program is accessed, typically by loading the program 50 on a computer station such as the workstation 12A and calling the program up with the use of an operating system 25. Preferably, the query explain program 50 is configured to be in communication with a database system 54, such as through the interface module 56 of FIG. 3.

At a step 168, the query explain program 50 is linked in communication with a database system. Of course, the database system could be any suitable system, including a hierarchical system, bit in the depicted embodiment, the database system comprises the RDBMS 54. The communication link in the depicted embodiment comprises the interface module 56, as described above, preferably operating over a network 14.

At a step 170, the method 160 accesses a query identification module 102. This is done when a user wishes to conduct a dynamic explain function, and may merely comprise calling up a user interface from an appropriate menu or with a suitable command. In the depicted embodiment, the GUI window 106 is called up. At a step 172, a user designates a query 115 for which query explain data is desired to be generated. The query 115 is received by the GUI window 106 and passed to the query identification module 102.

The user designation of the query 115 may be selecting the query from menus or the like, or may comprise selecting the query from a previous window, and the query is passed to the query identification module 102. Alternatively, the query 115 could be designated by modifying an existing query selected in one of the above manners, or by typing in, reading in, or pasting a new query in the query window 142.

At a step 174, the system settings module 104 is accessed by the user. While this can be conducted in any suitable manner, preferably the user accesses the GUI window 106, or a similar control. At a step 176, the user then selects a system setting or settings for which the user wishes the database system 54 to comply when generating query explain data 51 for the selected query 115. This operation is preferably conducted with the system setting controls 112. In the depicted example, the user uses the parallelism control 156 and the SQL ID control 120, and with the pull-down menu 158 selects a configuration that is desired. For instance, the user can make a selection involving no parallelism or the system default specification of parallelism.

The user may select to configure 178 one system setting 55 with the controls 112, or a plurality of system settings 55. Preferably, the system setting 55 is altered for only the generation of the query explain data 51 for the selected query 115, and afterwards is reset to the previous or default configuration.

The user continues to configure the settings as indicated by the step 180 and the method 160 loops 182 until all settings that the user desires to configure have been configured. The method 160 then progresses to step 184 in which the query 115 and system setting 55 are transmitted to the database system 54.

In step 186, database system 54 sets the system settings 55. Thereafter, in step 188, the explain request is transmitted and executed, after which the database system 54 generates the query explain data 51. Next, in step 190, the system settings 55 are reset, after which the explain data 51 is displayed, in step 192, to the user. In one embodiment, this comprises populating the explain table 51 for the selected query 115 and displaying the explain data as a graph or report.

The program continues to loop with step 194 and loop 196 while the user continues to have more queries for which he/she wishes to have query explain data 51 generated. When the user has no more queries, the method 160 ends at a step 198.

The apparatus and method of the present invention allow a user great flexibility in exploring hypothetical queries and query environments. The user is able to explore these queries easily and conveniently, greatly enhancing the capability for improving the efficiency of queries directed to the database system 54. Furthermore, as the user is able to configure the database system settings such as default parameters on-the-fly, great power is provided to the user to customize the investigations.

What is claimed and desired to be secured by United States Letters Patent is:

1. An apparatus for dynamically generating query explain data with user selection of settings of a database system remotely located across a network, the apparatus comprising:

a query explain program configured to operate on a first computer station communicating over the network with a second computer station hosting the database system, and further configured to initiate over the network, generation of query explain data by the database system;

a query identification module communicating with the query explain program and configured to receive user input comprising designation of a selected query for which the user wishes the database system to generate the query explain data; and a system settings module communicating with the query explain program and configured to receive a user designation of a database system setting with which the user wishes the database system to comply when generating the query explain data.

2. The apparatus of claim 1, wherein the second computer station comprises a server, the first computer station comprises a work station attached to the server, and the system setting comprises a default query execution setting.

3. The apparatus of claim 1, further comprising a graphical user interface window accessible through the query explain program, the graphical user interface window configured to be displayed on an output device connected to the first computer station and comprising user controls for configuring the system setting.

4. The apparatus of claim 3, wherein the graphical user interface window further comprises a SQL query text editor configured to receive the selected query from a user.

5. The apparatus of claim 3, wherein the graphical user interface window further comprises a SQL query designation module configured to allow a user to designate the selected query from among the plurality of existing queries previously generated for execution by the database system.

6. The apparatus of claim 3, wherein the graphical user interface window further comprises a SQL query designation module configured to allow a user to provide a new query via one of a text entry field, a user-specified text file, and a cut/paste operation.

7. The apparatus of claim 1, wherein the system setting comprises a degree of parallel processing with which the database system is to execute the selected query.

8. The apparatus of claim 1, wherein the system setting comprises a current SQL ID.

9. The apparatus of claim 1, wherein the system setting comprises a current SQL ID and a degree of parallel processing with which the database system is to execute the selected query.

10. The apparatus of claim 1, wherein the system settings module is configured to configure the system setting for only the selected query.

11. A method of dynamically generating query explain data with user selection of settings of a database system, the method comprising:

provinding a query explain program configured to operate on a first computer station;

receiving user input within the query explain program designating a selected query for which the user wishes the database system to generate query explain data; and receiving user input within the query explain program regarding a database system setting with which the user wishes the database system to comply when generating the query explain data.

12. The method of claim 11, wherein the system setting comprises a default query execution setting.

13. The method of claim 11, wherein the database system is configured to operate on a second computer station communicating remotely across a computer network with the first computer station.

14. The method of claim 11, further comprising providing a graphical user interface window accessible through the query explain program, the graphical user interface window configured to be displayed on an output device connected to the first computer station, and further comprising providing within the graphical user interface window user controls for configuring the system setting.

15. The method of claim 14, wherein providing the controls comprises providing a pull down list configured to receive the user designation of the system setting.

16. The method of claim 11, further comprising receiving within the query explain program the selected query from a user.

17. The method of claim 11, further comprising providing to the user a listing of a plurality of existing queries previously generated for execution by the database system and receiving from the user a designation of the selected query from among the plurality of existing queries.

18. The method of claim 11, wherein the system setting comprises a degree of parallel processing with which the database system is to execute the selected query.

19. The method of claim 11, wherein the system setting comprises a current SQL ID.

20. The method of claim 11, wherein the system setting comprises a current SQL ID and a degree of parallel processing with which the database system is to execute the selected query.

21. The method of claim 11, further comprising, in response to receiving the user designation of a database system setting configuring the database system setting in accordance with the user designation for only the selected query.

22. An article of manufacture comprising a program storage medium readable by a processor and embodying one or more instructions executable by the processor to perform a method of dynamically generating query explain data with user selection of settings of a database system remotely located across a network, the method comprising:

providing a query explain program configured to operate on a first computer station communicating over the network with a second computer station hosting the database system, receiving user input within the query explain program designating a selected query for which the user wishes the database system to generate query explain data; and receiving user input within the query explain program regarding a database system setting, with which the user wishes the database system to comply when generating the query explain data.

23. The article of manufacture of claim 22, wherein the second computer station comprises a server, the first computer station comprises a work station attached to the server, and the system setting comprises a default query execution setting.

24. The article of manufacture of claim 22, further comprising providing a graphical user interface window accessible through the query explain program, the graphical user interface window configured to be displayed on an output device connected to the first computer station, the method further comprising providing within the graphical user interface window user controls for configuring the system setting.

25. The article of manufacture of claim 24, wherein providing the controls comprises providing a pull down list configured to receive the user designation of the system setting.

26. The article of manufacture of claim 22, further comprising receiving within the query explain program the selected query from a user.

27. The article of manufacture of claim 22, further comprising providing to the user a listing of plurality of existing queries previously generated for execution by the database system and receiving from the user a designation of the selected query from among the plurality of existing queries.

28. The article of manufacture of claim 22, wherein the system setting comprises a degree of parallel processing with which the database system is to execute the selected query.

29. The article of manufacture of claim 22, wherein the system setting comprises a current SQL ID.

30. The article of manufacture of claim 22, wherein the system setting comprises a current SQL ID and a degree of parallel processing with which the database system is to execute the selected query.

31. The article of manufacture of claim 22, further comprising, in response to receiving the user designation of a database system setting configuring the database system setting in accordance with the user designation for only the selected query.

* * * * *

UNITED STATES PATENT AND TRADEMARK OFFICE
CERTIFICATE OF CORRECTION

PATENT NO.   : 6,618,718 B1
DATED        : September 9, 2003
INVENTOR(S)  : Couch It is certified that error appears in the above-identified patent and that said Letters Patent is hereby corrected as shown below:

Drawings,
Figure 6, "158" should read -- 156 --.
Figure 7, window around 115 text should be labeled -- 142 --.
Figure 8, should be collectively labeled -- 160 --.

Column 2,
Line 5, "path" should read -- path, --.

Column 10,
Line 58, "method 160, of" should read -- method 160 of --.

Column 11,
Line 10, "bit" should read -- but --.

Signed and Sealed this

Thirtieth Day of December, 2003

JAMES E. ROGAN
*Director of the United States Patent and Trademark Office*